US011737047B2

(12) United States Patent
Bao et al.

(10) Patent No.: US 11,737,047 B2
(45) Date of Patent: Aug. 22, 2023

(54) OUTLIER REJECTION FOR POSITIONING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/490,682

(22) Filed: Sep. 30, 2021

(65) Prior Publication Data

US 2022/0124665 A1 Apr. 21, 2022

Related U.S. Application Data

(60) Provisional application No. 63/092,260, filed on Oct. 15, 2020.

(51) Int. Cl.
*H04W 64/00* (2009.01)
(52) U.S. Cl.
CPC .................................. *H04W 64/00* (2013.01)

(58) Field of Classification Search
None
See application file for complete search history.

(56) References Cited

U.S. PATENT DOCUMENTS

2016/0119851 A1* 4/2016 Moeglein ............ H04W 52/285
455/440

* cited by examiner

*Primary Examiner* — Suhail Khan
(74) *Attorney, Agent, or Firm* — Muncy, Geissler, Olds & Lowe, P.C./Qualcomm

(57) ABSTRACT

Disclosed are techniques for wireless positioning. In an aspect, a positioning entity determines an initial set of wireless links over which positioning reference signals (PRS) are measured by a network node engaged in a positioning session, identifies a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link, and determines a location of the network node based on observed positioning measurements of the identified subset of wireless links.

30 Claims, 13 Drawing Sheets

OUTLIER REJECTION FOR POSITIONING

CROSS-REFERENCE TO RELATED APPLICATIONS

The present application for patent claims the benefit of U.S. Provisional Application No. 63/092,260, entitled "OUTLIER REJECTION FOR POSITIONING," filed Oct. 15, 2020, assigned to the assignee hereof, and expressly incorporated herein by reference in its entirety.

BACKGROUND OF THE DISCLOSURE

1. Field of the Disclosure

Aspects of the disclosure relate generally to wireless positioning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a positioning entity includes determining an initial set of wireless links over which positioning reference signals (PRS) are measured by a network node engaged in a positioning session; identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determining a location of the network node based on observed positioning measurements of the identified subset of wireless links.

In an aspect, a positioning entity includes a memory; at least one transceiver; and at least one processor communicatively coupled to the memory and the at least one transceiver, the at least one processor configured to: determine an initial set of wireless links over which positioning reference signals (PRS) are measured by a network node engaged in a positioning session; identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

In an aspect, a positioning entity includes means for determining an initial set of wireless links over which positioning reference signals (PRS) are measured by a network node engaged in a positioning session; means for identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and means for determining a location of the network node based on observed positioning measurements of the identified subset of wireless links.

In an aspect, a non-transitory computer-readable medium stores computer-executable instructions that, when executed by a positioning entity, cause the positioning entity to: determine an initial set of wireless links over which positioning reference signals (PRS) are measured by a network node engaged in a positioning session; identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
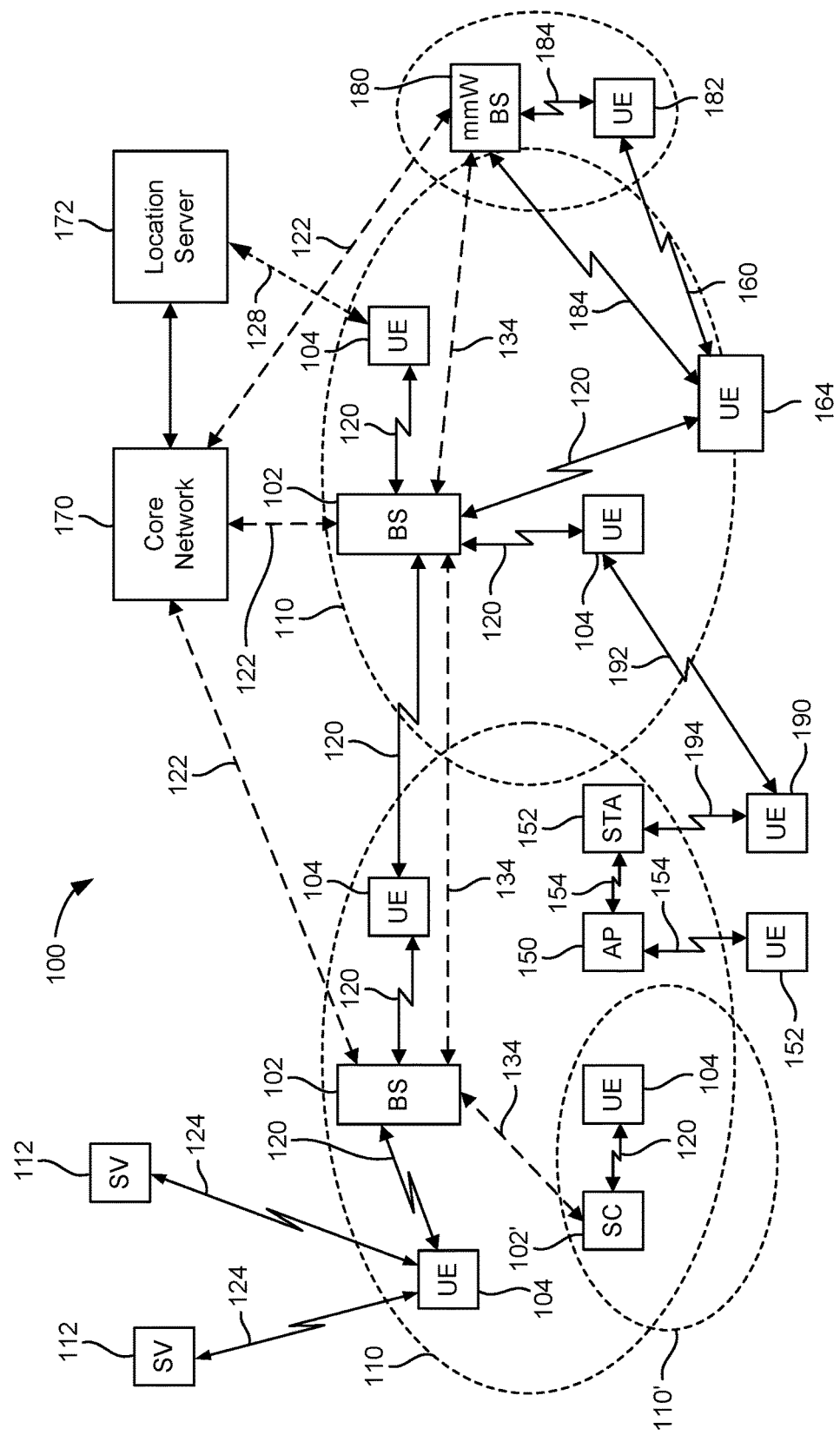
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
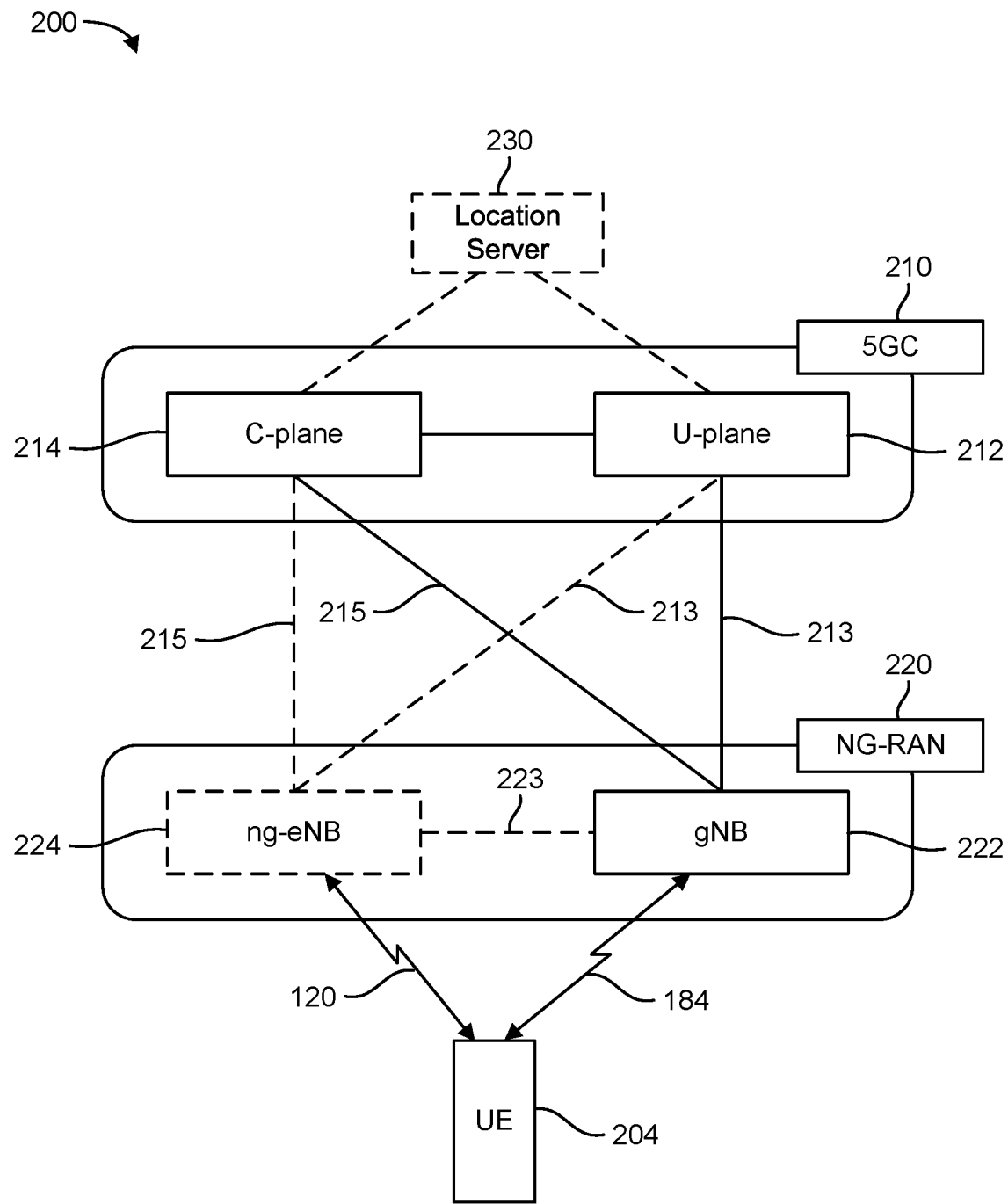
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
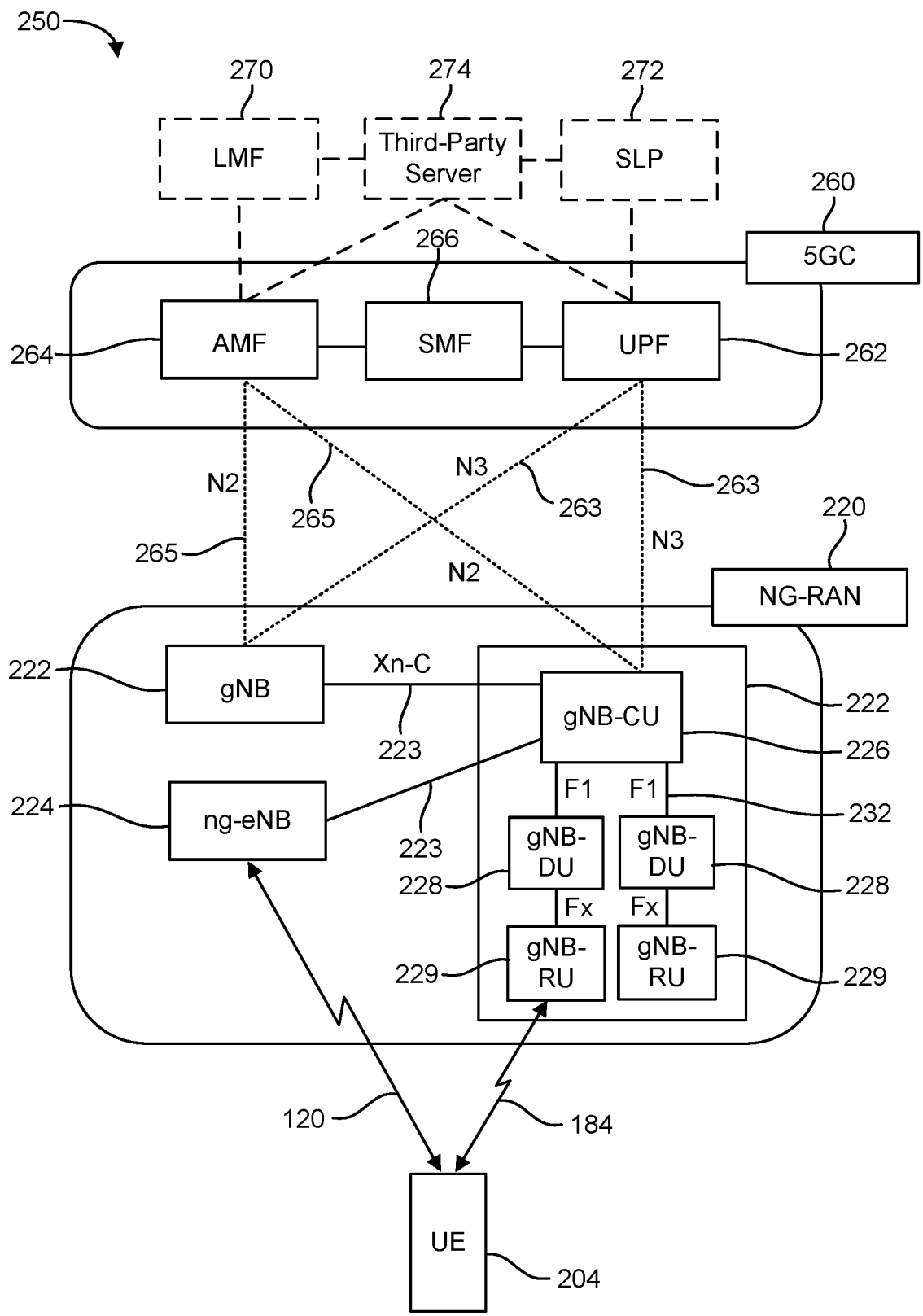

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
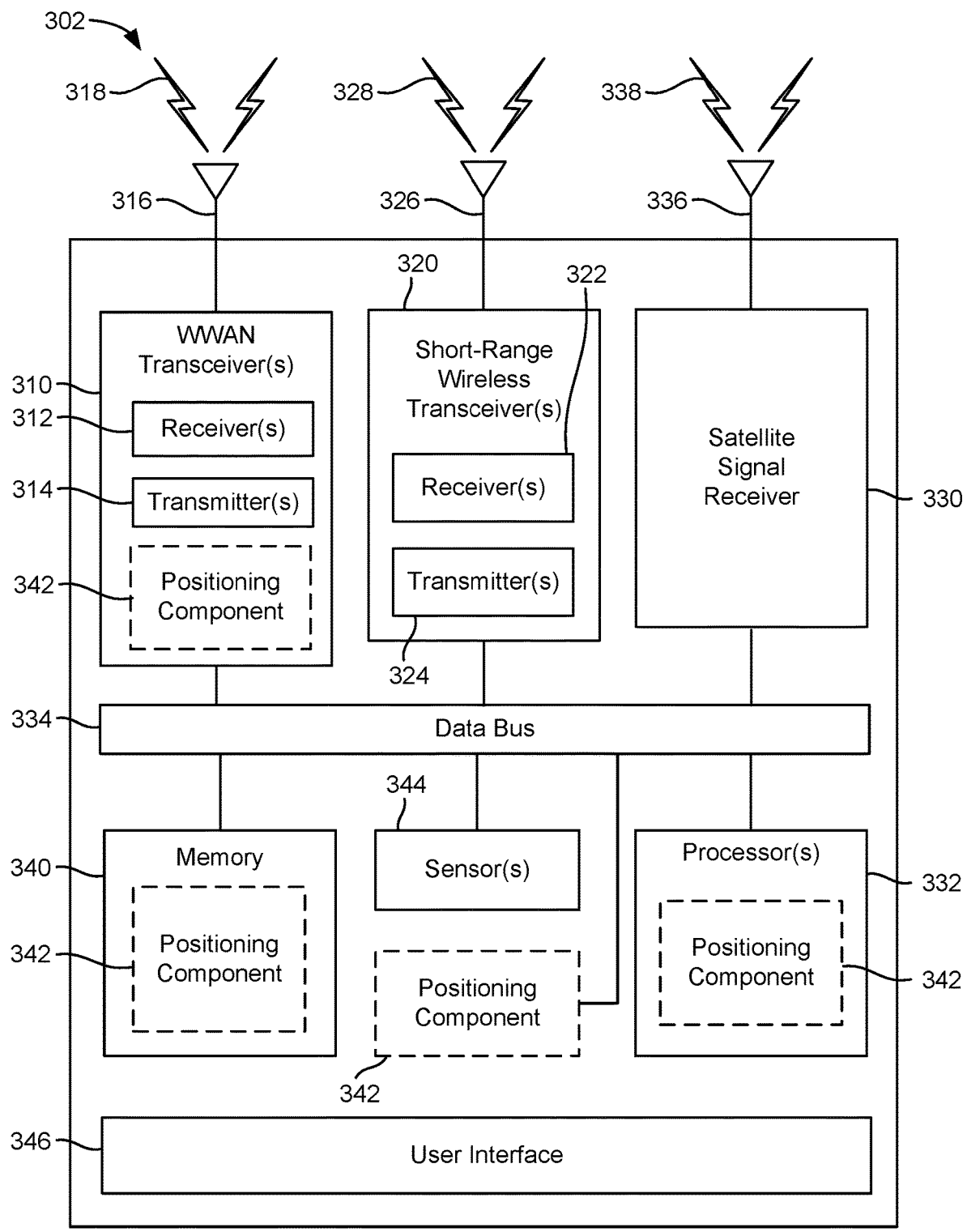
FIGS. 3A, 3B, and 3C are simplified block diagrams of several sample aspects of components that may be employed in a user equipment (UE), a base station, and a network entity, respectively, and configured to support communications as taught herein.
Figure 3B:
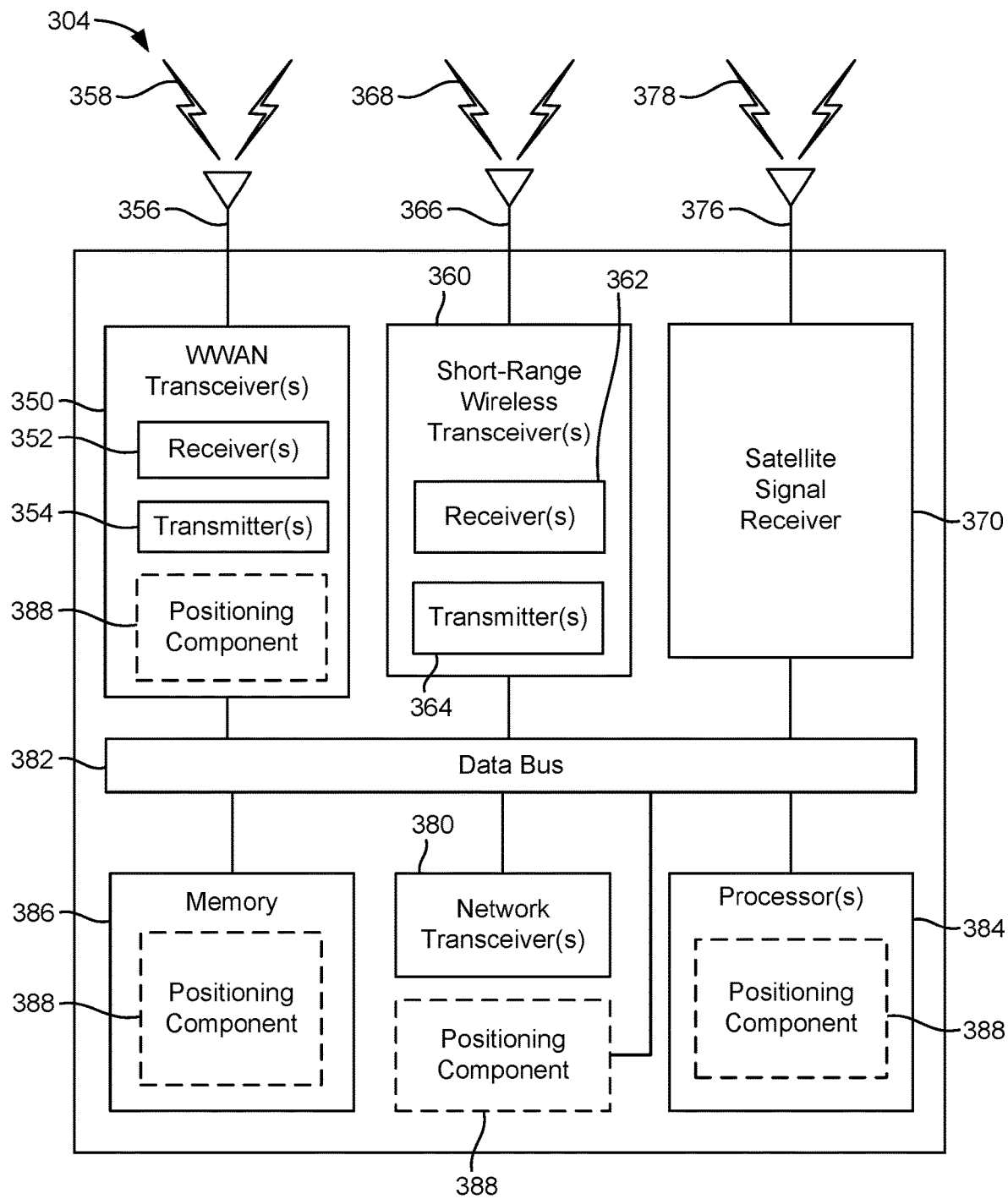
Figure 3C:
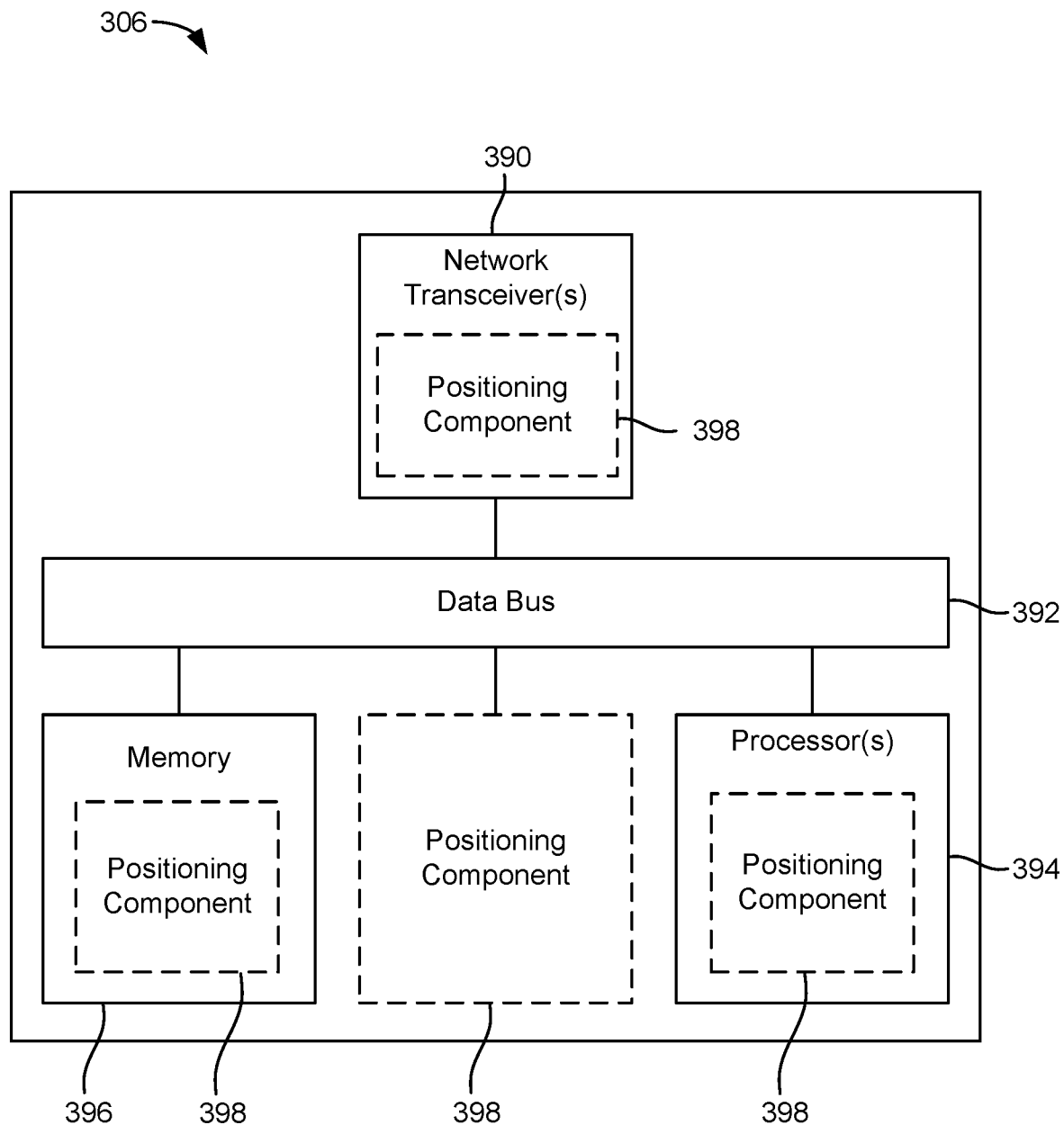

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
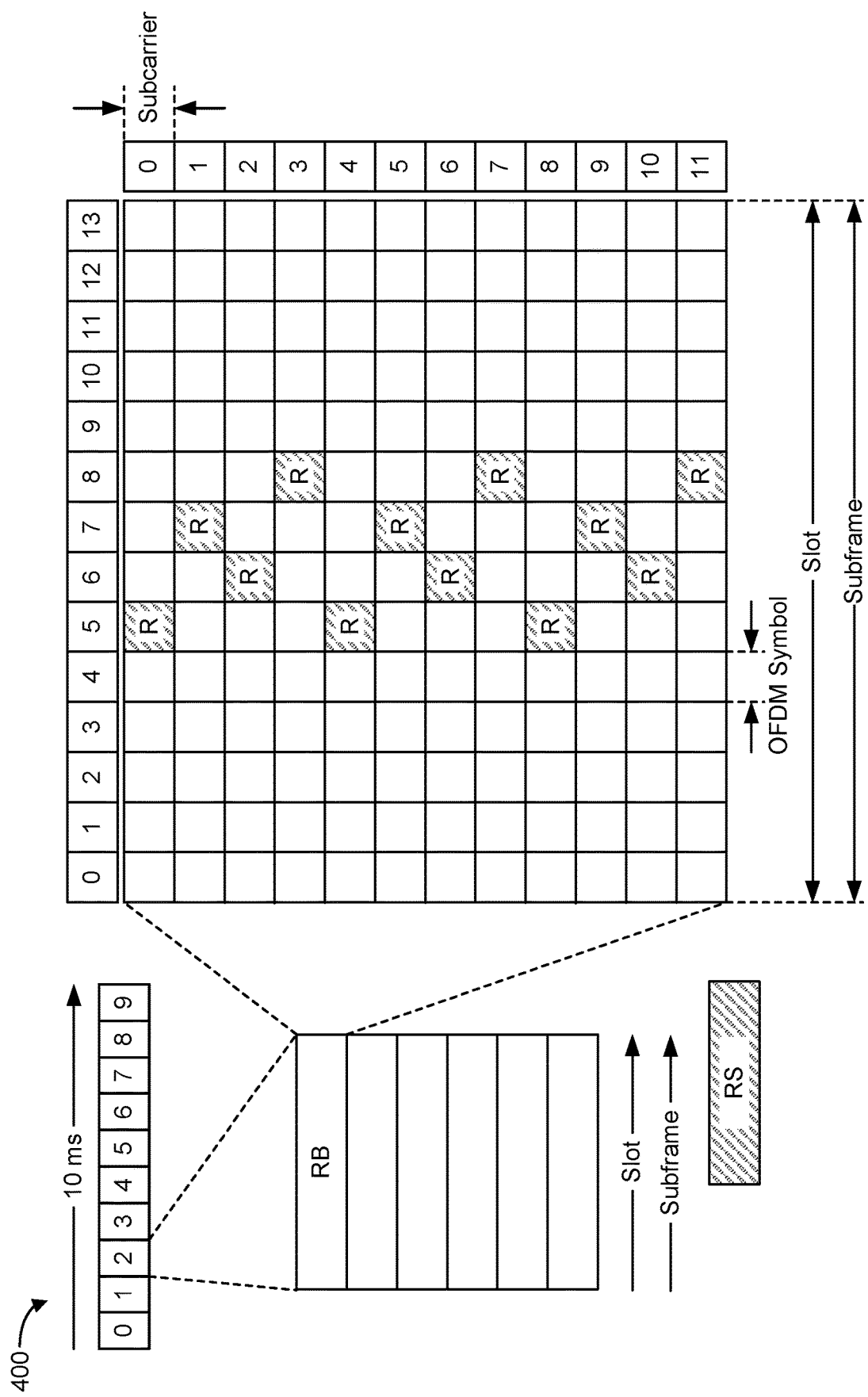
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\wedge\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
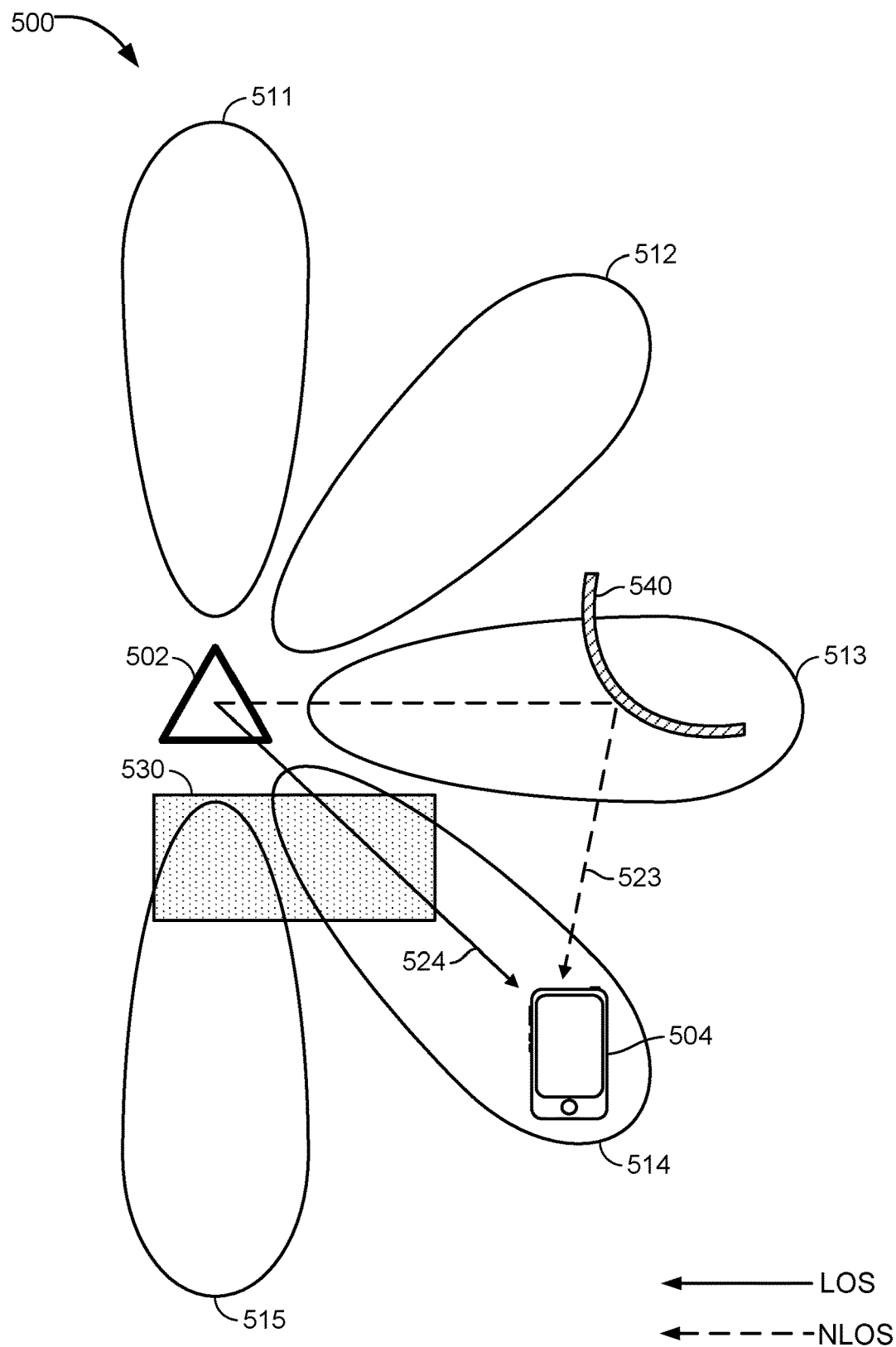
FIG. 5 illustrates an example wireless communications system according to aspects of the disclosure.

FIG. 5 illustrates an example wireless communications system 500 according to aspects of the disclosure. In the example of FIG. 5, a UE 504 (e.g., any of the UEs described herein) is attempting to calculate an estimate of its location, or to assist another entity (e.g., a base station or core network component, another UE, a location server, a third party application, etc.) to calculate an estimate of its location. The UE 504 may communicate wirelessly with a base station 502 (e.g., any of the base stations described herein) using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas or an array of antenna elements of a single antenna panel of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission (e.g., frame, slot, and/or OFDM symbol number) of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives a non-line of sight (NLOS) data stream 523 of RF signals transmitted on beam 513 and a line of sight (LOS) data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

The beam of interest for data communication between a transmitter (e.g., base station 502) and a receiver (e.g., UE 504) is the beam carrying RF signals that arrives at the receiver with the highest signal strength (e.g., the highest RSRP or SINR), whereas the beam of interest for position estimation is the beam carrying RF signals that excites the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may usually be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed. The beam(s) over which the UE 504 is communicating with the base station or which the UE 504 is measuring for positioning purposes are referred to as "links" or "channels."

Figure 6:
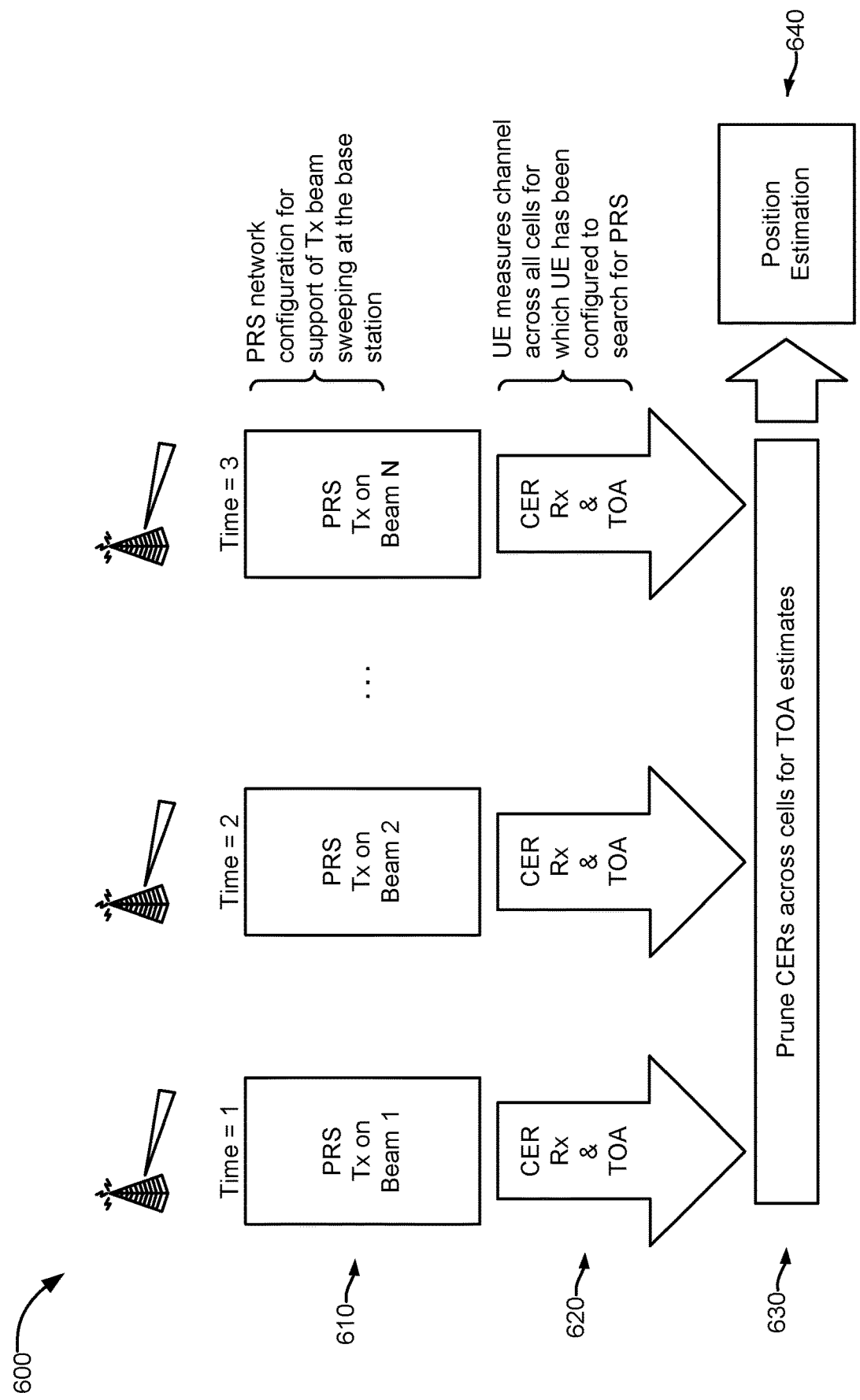
FIG. 6 is a diagram of an example physical layer procedure for processing PRS transmitted on multiple beams, according to aspects of the disclosure.

FIG. 6 is a diagram of an example physical layer procedure 600 for processing PRS transmitted on multiple beams, according to various aspects of the disclosure. At stage 610, the network (e.g., location server 230, LMF 270, SLP 272) configures a given base station (e.g., a gNB) to transmit beamformed PRS to one or more UEs in the coverage area(s) of the cell(s) supported by the base station. The PRS configuration may include multiple instances of PRS to be beam swept across all AoDs for each cell at full transmit power per beam. In the example of FIG. 6, the base station transmits PRS on a first beam (labeled "Beam 1") at a first time ("Time=1"), a second beam (labeled "Beam 2") at a second time ("Time=2"), and so on until an Nth beam (labeled "Beam N") at an Nth time ("Time=N"), where N is an integer from 1 to 128 (i.e., there may be as many as 128 beams for a single cell). The illustrated beams may be for a particular cell supported by the base station, and the base station may beam sweep PRS in each of the cells it supports. The base station may beam sweep using a single antenna or antenna array, in which case, that antenna or antenna array transmits each beam (Beams 1 to N). Alternatively, the base station may beam sweep using multiple antennas or antenna arrays, in which case, each antenna or antenna array transmits one or more of Beams 1 to N.

At 620, a given UE monitors all cells of the base station that it has been configured by the network to monitor and that are configured to transmit PRS across the configured instances. There may need to be several PRS instances/occasions to permit the UE to detect a sufficient number of cells for positioning (due to the time it takes the UE to tune its radio from one cell to another and then monitor the cell). The UE measures the channel, and in particular, the channel frequency response (CFR), from which it can derive the channel energy response (CER) and ToA across all cells for which the UE has been configured to search for PRS. More specifically, applying an IFFT to the CFR transforms the frequency data of the measured channel into the time domain CER (also referred to as the "channel impulse response" (CIR)).

At 630, the UE prunes the CERs across the measured cells to determine the ToAs of the PRS beams. In estimating the ToA of a beam from the CER, an earliest arrival path (which is expected to be, but which may not be, the LOS path) for the beam is determined using a noise-related quality threshold to eliminate spurious local peaks in the CER. A ToA estimate is chosen such that it is the earliest local maximum of the CER for the beam. For example, a ToA estimate may be chosen such that it is the earliest peak that is at least some threshold 'X' dB higher than the median of the CER and is at most some threshold 'Y' dB lower than the main peak. The earliest arriving beam is considered the "link" to the base station being measured.

At 640, the ToAs can be used to estimate the position of the UE using, for example, OTDOA/DL-TDOA, RTT, DL-AoD, etc. For example, the UE can calculate RSTD or Rx-Tx measurements based on the ToAs of the PRS. The UE can then estimate its location based on these measurements if it has been provided with a base station almanac (BSA) that includes the physical locations of the involved base stations. Alternatively, the network can estimate the location of the UE if the UE reports the ToA (or RSTD, Rx-Tx, etc.) measurements to the network.

Note that while FIG. 6 illustrates the process of determining the ToAs of the beams of a single base station, this is for simplicity. In many cases, a UE will measure the beams from multiple base stations in order to obtain a 2D or 3D location estimate. Since timing-based and angle-based positioning methods rely on accurate LOS detection and NLOS rejection, the UE may need to prune the links across all base stations to select the base station(s) with which there are the LOS condition. That is, the UE may need to prune out the NLOS links to only use the LOS links for the location estimate.

The present disclosure provides an iterative algorithm for outlier rejection when using positioning techniques that rely on LOS links. By rejecting NLOS outliers, the disclosed algorithm improves positioning accuracy.

Figure 7:
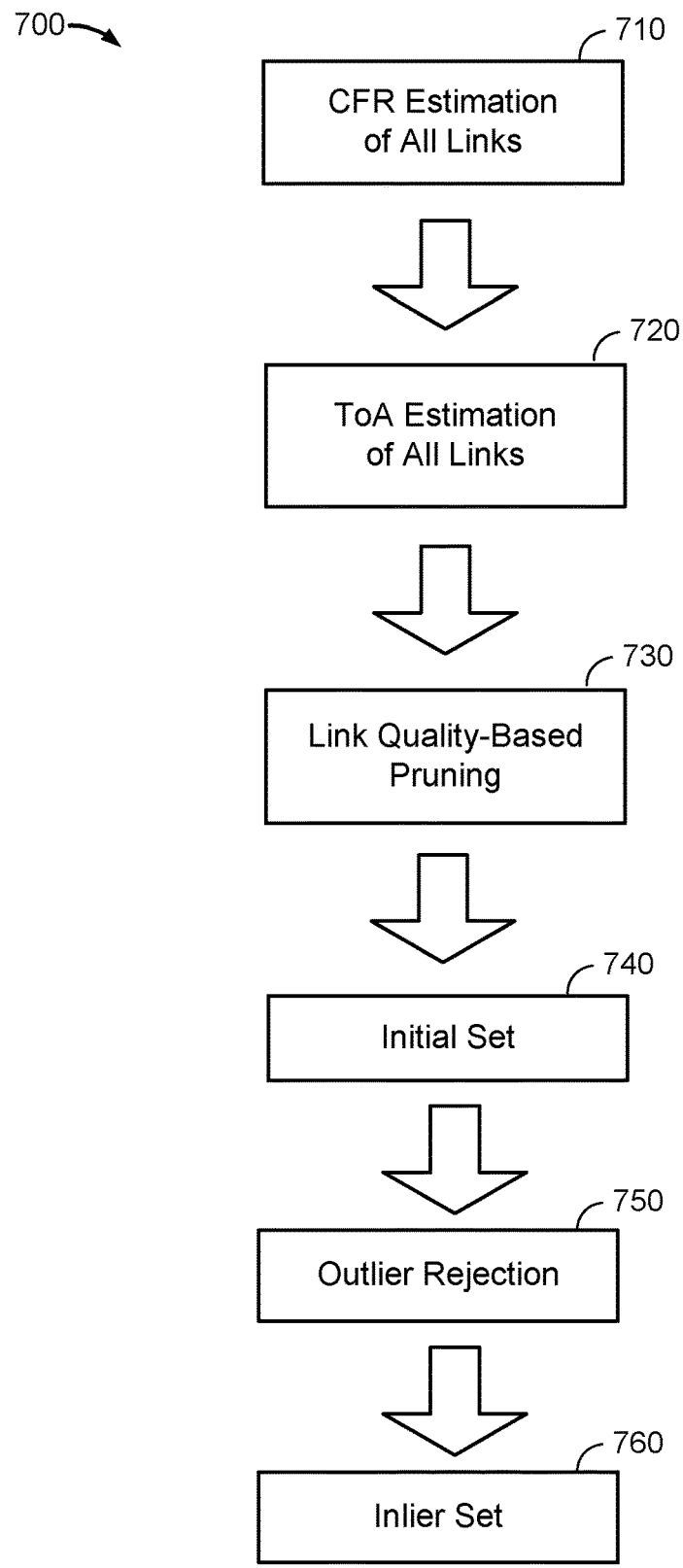
FIG. 7 illustrates an example flow for determining the inlier set of links for purposes of location estimation, according to aspects of the disclosure.

FIG. 7 illustrates an example flow 700 for determining the inlier set of links for purposes of location estimation. At 710, the UE estimates the CFRs of all links over which it received/measured PRS (i.e., all received/measured beams, which may be transmitted by one or more TRPs/cells). At 720, the UE estimates the ToAs (or other timing-based measurement) of each link based on the CERs of the CFRs, as described above with reference to 620 of FIG. 6. At 730, the UE prunes the links based on link quality (e.g., RSRP, RSRQ, SINR, etc.). This results in an initial set of links at 740. At 750, the UE performs an outlier rejection procedure on the initial set of links.

Figure 8:
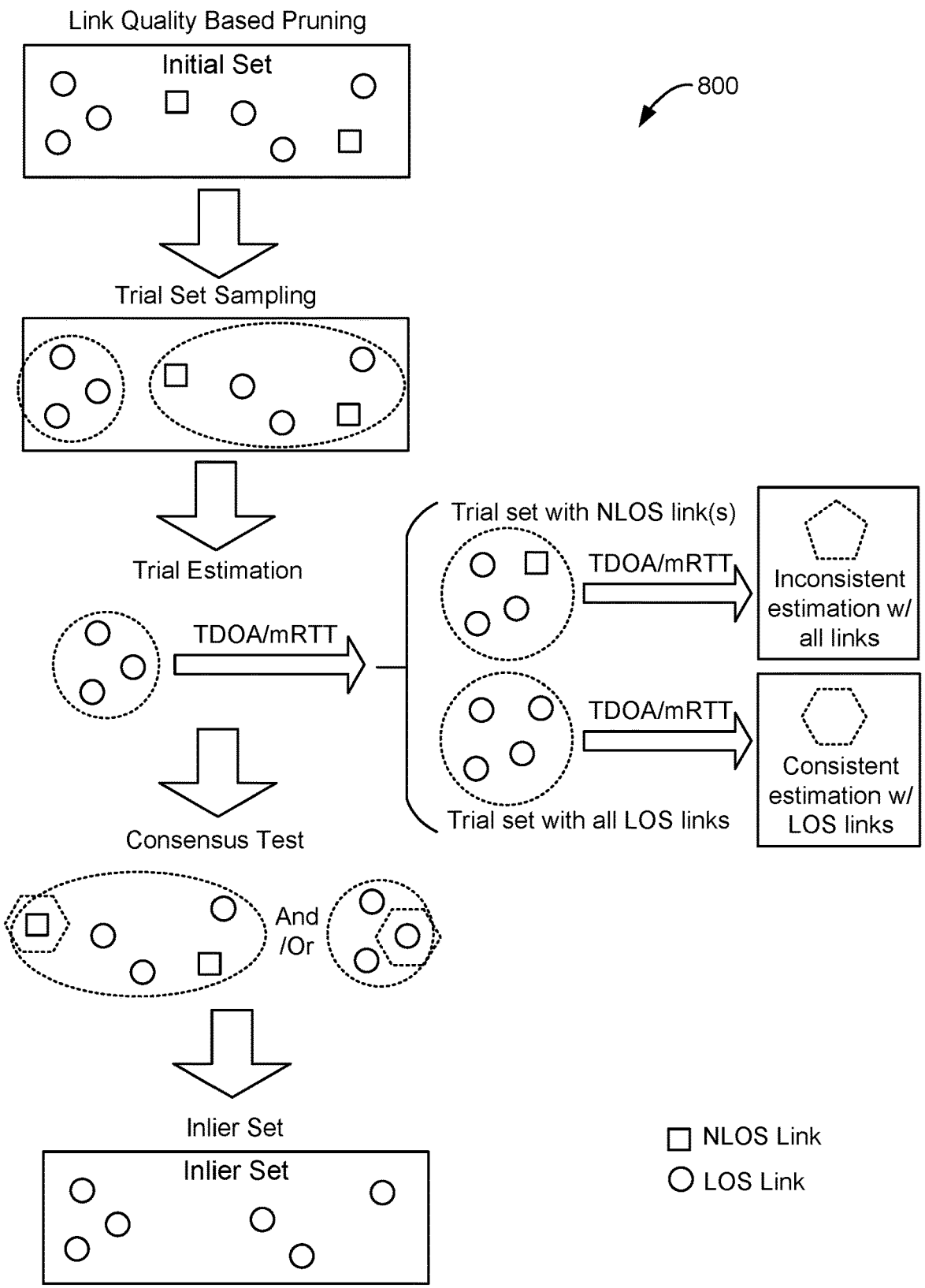
FIG. 8 is a diagram illustrating the general procedure of a random sample consensus (RANSAC) algorithm.

Currently, at 750, the UE may perform a conventional random sample consensus (RANSAC) procedure to prune the initial set of links to perform the outlier rejection. FIG. 8 is a diagram 800 illustrating the general procedure of a RANSAC algorithm. The RANSAC algorithm is an iterative outlier rejection method. The basic philosophy is based on majority voting. It randomly picks a trial set within the initial set and conducts a consensus test to reject the outliers.

Referring back to FIG. 7, the outlier rejection procedure at 750 can be replaced by the outlier rejection algorithm disclosed herein, described in greater detail below. The outlier rejection procedure results in a set of inlier links at 760. The set of inlier links can then be used to estimate the location of the UE being positioned.

Note that the link quality-based pruning at 730 is a pre-pruning procedure and is optional. The benefit of performing it, however, is to improve the quality (i.e., the ratio of LOS links) of the initial set of links and reduce the computational complexity of the subsequent outlier rejection. In addition, fewer iterations of the outlier rejection procedure will be needed, thereby reducing computational complexity.

The disclosed outlier rejection algorithm is a modified RANSAC algorithm. At a high level, the disclosed outlier rejection algorithm iterates over all combinations of a subset of all measured links in the initial set of links (the initial set of links U) or a random sampling of all links. More specifically, in each iteration, the algorithm selects a subset of links A to use to estimate the UE's location and calculates the estimated ToA of each link in the initial set U based on the estimated location. Then the algorithm calculates the estimated errors (the absolute value of the difference between the estimated ToA and the observed ToA (i.e., abs(|est(ToA)−obs(ToA)|) for each link in U) and compares the estimated errors with one or more thresholds. This is referred to as the consensus test. If one link passes the test (e.g., the error is smaller than a threshold, or larger than a threshold, etc.), then this link is selected into the inlier set L. The algorithm may store the estimated errors as consensus test errors for later processing or stop when a consensus is reached (or, said another way, when the consensus test passes for a set of links A). A consensus being reached means that the size of the inlier set L given a certain set of links A is greater than or equal to the minimum number of links needed for the positioning requirement, or the error threshold of the consensus test can be relaxed up to some number of times, or the error threshold reaches a maximum threshold bound. In general, the algorithm conducts the consensus test to find the best set of inlier links X.

Figure 9:
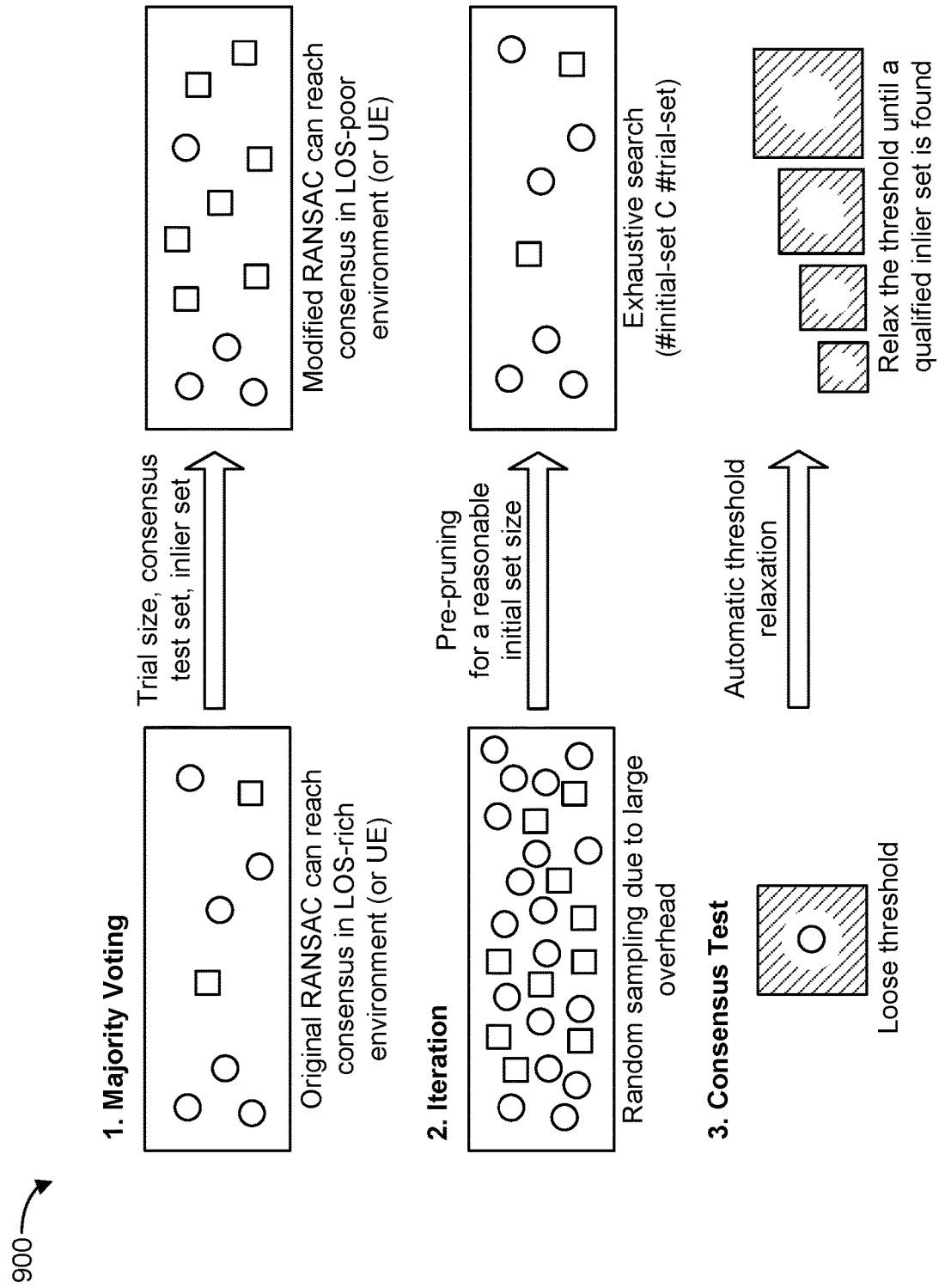
FIG. 9 is a diagram illustrating the general procedure of the disclosed outlier rejection algorithm, according to aspects of the disclosure.

FIG. 9 is a diagram 900 illustrating the general procedure of the disclosed outlier rejection algorithm, according to aspects of the disclosure. All three factors illustrated in FIG. 9, majority voting, iteration, and consensus test, can contribute to the improvement of the disclosed outlier rejection procedure over a conventional RANSAC algorithm. For example, the proposed consensus test focuses more on the whole accuracy improvement (over all the cumulative distribution function (CDF)). The changes to the iteration and majority voting stages improve the CDF tail.

Referring now to the outlier rejection algorithm disclosed herein in greater detail, the first stage is to identify the set U, which is the initial set of links whose PRS can be detected (e.g., based on link quality). The initial set of links may include links to multiple cells of the same base station, different base stations, positioning beacons, other UEs (i.e., sidelinks), etc. From the set U, the UE chooses a set A consisting of K links chosen deterministically or randomly. K should be the minimum number of links for the positioning algorithm being used. For example, for a 2D RTT positioning procedure, K should be set to three, whereas for a 2D DL-TDOA positioning procedure, K should be set to four. The reason is that if only the minimum number of LOS links is available, the subsequent consensus test may pass if all the links in the trial set are all LOS.

If the number of possible combinations of links (e.g., one link from each of three base stations) is less than the number of iterations M (e.g., a manually selected threshold or number of link combinations), then the UE may perform an exhaustive search to identify additional links or skip the link quality-based pruning stage (e.g., stage 730 of FIG. 7).

Next, the UE assumes the observed ToA (or other timing-based measurement) samples from the selected set A are correct and estimates its location based on that set of links. Using this estimation, the UE computes the estimated ToAs for all links in the set U. The UE then conducts a consensus test. Specifically, the UE determines a set of one or more links L that are the set of inliers in U. First, the UE determines whether or not the absolute value of the difference between the estimated ToA and the observed ToA is less than T (i.e., |est(ToA)−obs(ToA)|<T) for all links in the set U, where T is the tolerance threshold to declare a ToA sample an inlier. The value of T can be selected based on the bandwidth of the PRS, interpolation, etc. It can be either dynamically adjusted or a fixed value (threshold). Second, the UE determines whether the difference between the estimated ToA and the observed ToA is greater than zero (i.e., est(ToA)−obs(ToA)>0) for all links in U other than the set of links A (this is a consensus test for RSTD and ToA measurements). An inlier is a link for which the estimated ToA matches the observed ToA (within tolerance T).

The UE iterates over different choices of A and selects the set A that results in the best inlier set X. The best inlier set X should have the largest number of links in the set L and/or the fewest consensus test errors (i.e., the sum of |est(ToA)−obs(ToA)| over all inlier links. The UE can then compute the final location estimate using the best inlier set X.

Although the foregoing has described the UE performing the outlier rejection algorithm, the algorithm may instead be performed by a different positioning entity, such as a location server (e.g., location server 230, LMF 270, SLP 272), the UE's serving base station, a third-party application, etc.

The following provides additional details for certain aspects of the disclosed outlier rejection algorithm. As noted above, for each iteration, the UE selects a set of links A out of the initial set U. The UE can do so using random sampling, deterministic sampling, or incremental sampling. With respect to random sampling, if the number of combinations is too large (raising a concern about processing overhead), the UE can conduct random sampling with a maximum iteration number Z based on the computational budget allocated to positioning and/or latency considerations of the positioning session. To improve the efficiency, the random sampling may consider to exclude any duplicated trial set A over the iterations (a pure random sampling may pick the same A over multiple iterations). With respect to deterministic sampling, if the number links in the set U other than the links in the set A is smaller than the maximum iteration number Z, the UE can first list all the combinations with exhaustive searching (i.e., the number of links in the initial set U is the same as the number of links in the trial set A). With respect to incremental sampling, the UE may select a set of links V out of U where the number of links in the set V is greater than the minimum requirement for the number of links in the set A. Then the UE can perform deterministic sampling on the set of links A selected from V. If no consensus is reached, the UE can add one or more links W from the set of links U minus the set of links V. The UE can then perform deterministic sampling on the set of links A selected from the union of V and W, but not the combination in A selected from V until a condition is met. The condition may be (1) the number of iterations is equal to Z, (2) a consensus is passed, or (3) the number of links in V is the same as the number of links in U (i.e., all the combinations within U have been tested).

Referring now to the consensus test in greater detail. Here there are multiple options for the value of T. As a first option, the value of T may be a fixed threshold. This threshold value can be selected based on the bandwidth of the PRS and/or the UE (i.e., the UE's operational bandwidth), an interpolation algorithm, noise, SINR, etc. Alternatively, the value of T may be dynamically adjusted (e.g., automatically relaxed). The value of T may start as a tight (small) threshold and gradually increase (linearly or exponentially) until (1) one or more consensus sets L are reached, or (2) it reaches a preselected (e.g., manually selected) number of relaxations, or (3) it reaches a maximum threshold bound. The UE then selects the set L with the largest size and/or the minimum total consensus test errors (i.e., the sum of the absolute value of the difference between the estimated ToA and the observed ToA for all links tested, i.e., sum(|est(ToA)−obs(ToA)|)).

There are additional considerations where the positioning procedure is a TDOA procedure. For example, if the TDOA procedure is UE-assisted (e.g., DL-TDOA), then the RSTD measurements are reported based on a reference cell recommended by the location server (e.g., LMF 270). However, the reference cell may result in larger RSTD errors than another cell. To reduce the impact of such a reference cell, the outlier rejection algorithm can consider swapping the reference cell based on the RSTD measurements. For example, if a first cell (denoted "0") is the pre-selected reference cell and five other cells are target cells (denoted "1" to "5") are other cells with RSTD measurements of {1, 0}, {2, 0}, {3, 0}, {4, 0}, and {5, 0}, then to change the reference cell to the cell denoted "1," the RSTD measurements {1, 1}, {2, 1}, {3, 1}, {4, 1}, and {5, 1} would be the RSTD measurements {1, 0}, {2, 0}, {3, 0}, {4, 0}, and {5, 0} minus the RSTD measurement {1, 0}.

The outlier rejection algorithm described above can also be used for angle-based positioning (e.g., UL-AoA, DL-AoD, etc.). The algorithm would be the same, but instead of using the observed and estimated ToAs of the respective links, the algorithm would use the observed and estimated angles of the links. For the consensus test, as with the consensus test for timing-based positioning, the threshold T may be a fixed threshold or a dynamically adjustable threshold. With respect to the fixed threshold option, the value of T can be selected based on the bandwidth of the PRS and/or the UE (i.e., the UE's operational bandwidth), an interpolation algorithm, link noise, SINR of the link, antenna configuration/RF structure at the UE or base station, beamwidth angle resolution, etc. Alternatively, the value of T may be dynamically adjusted (e.g., automatically relaxed). The value of T may start as a tight (small) threshold and gradually increase (linearly or exponentially) until (1) one or more consensus sets L are reached, or (2) it reaches a preselected (e.g., manually selected) number of relaxations, or (3) it reaches a maximum threshold bound. The UE then selects the set L with the largest size and/or the minimum total consensus test errors (i.e., the sum of the absolute value of the difference between the estimated angle and the observed angle (i.e., sum(|est(angle)−obs(angle)|)) for all links tested.

In an aspect, a UE (or other positioning entity) may perform both a timing-based outlier rejection algorithm and an angle-based outlier rejection algorithm. In this "mixed mode," the consensus test could be, for each link tested, whether or not the absolute value of the difference between the estimated angle and the observed angle is less than an angle-based threshold T (i.e., |est(angle)−obs(angle)|<T_a), and whether or not the absolute value of the difference between the estimated ToA and the observed ToA is less than a timing-based threshold T (i.e., |est(ToA)−obs(ToA)|<T_t). In an aspect, the final result for the positioning algorithm may be the union or intersection of the results of the two tests. Another approach is that the algorithm can use timing-based result as a pre-pruning operation to select the angle measurement in the outlier rejection test (what to include in the initial set of angle measurement), and vice versa.

Figure 10:
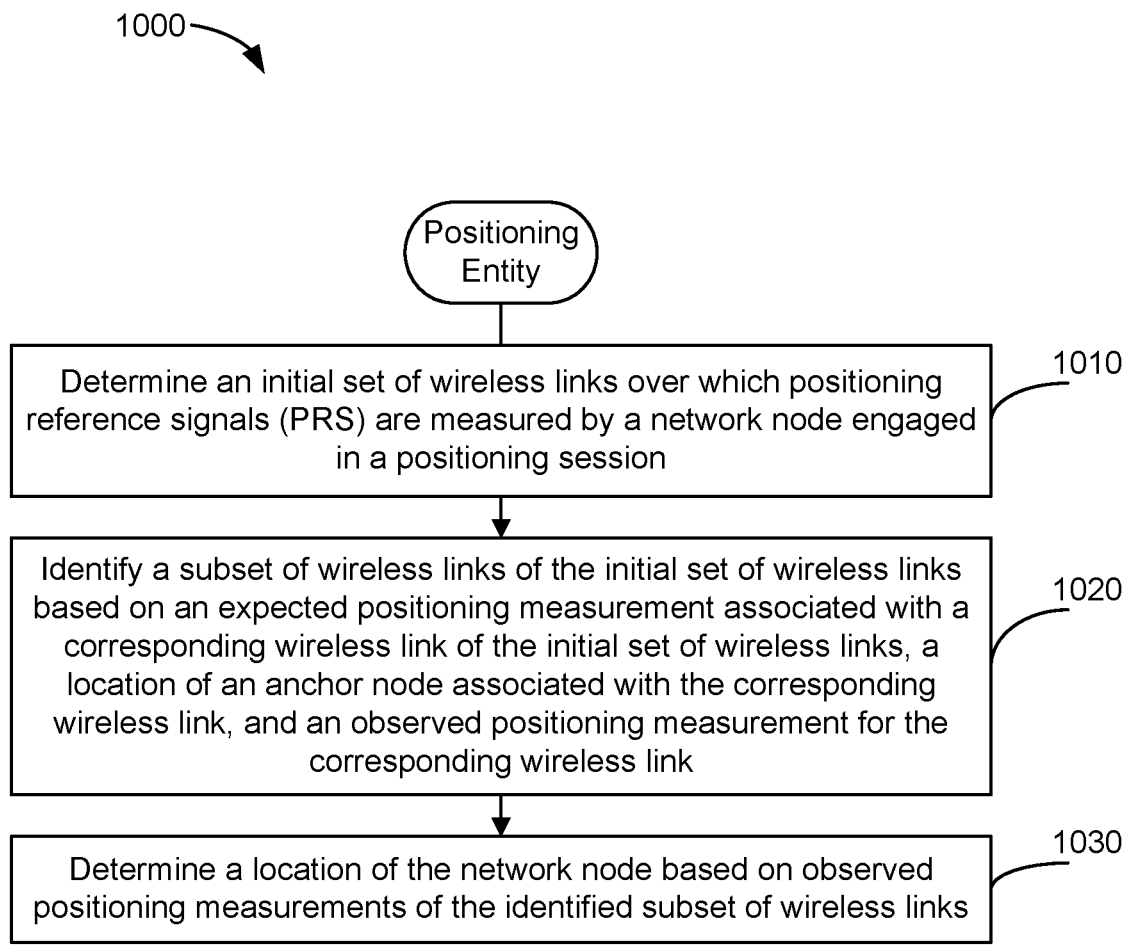
FIG. 10 illustrates an example method of wireless positioning, according to aspects of the disclosure.

FIG. 10 illustrates an example method 1000 of wireless communication, according to aspects of the disclosure. In an aspect, method 1000 may be performed by a positioning entity (e.g., a component of any of the UEs, base stations, or location servers described herein).

At 1010, the positioning entity determines an initial set of wireless links over which PRS are measured by a network node engaged in a positioning session. In an aspect, where the positioning entity is a component of a UE, operation 1010 may be performed by the one or more WWAN transceivers 310, the one or more processors 332, memory 340, and/or positioning component 342, any or all of which may be considered means for performing this operation. In an aspect, where the positioning entity is a component of a base station, operation 1010 may be performed by the one or more WWAN transceivers 350, the one or more network transceivers 380, the one or more processors 384, memory 386, and/or positioning component 388, any or all of which may be considered means for performing this operation. In an aspect, where the positioning entity is a component of a location server, operation 1010 may be performed by the one or more network transceivers 390, the one or more processors 394, memory 396, and/or positioning component 398, any or all of which may be considered means for performing this operation.

At 1020, the positioning entity identifies a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link. In an aspect, where the positioning entity is a component of a UE, operation 1020 may be performed by the one or more WWAN transceivers 310, the one or more processors 332, memory 340, and/or positioning component 342, any or all of which may be considered means for performing this operation. In an aspect, where the positioning entity is a component of a base station, operation 1020 may be performed by the one or more WWAN transceivers 350, the one or more network transceivers 380, the one or more processors 384, memory 386, and/or positioning component 388, any or all of which may be considered means for performing this operation. In an aspect, where the positioning entity is a component of a location server, operation 1020 may be performed by the one or more network transceivers 390, the one or more processors 394, memory 396, and/or positioning component 398, any or all of which may be considered means for performing this operation.

At 1030, the positioning entity determines a location of the network node based on observed positioning measurements of the identified subset of wireless links. In an aspect, where the positioning entity is a component of a UE, operation 1030 may be performed by the one or more WWAN transceivers 310, the one or more processors 332, memory 340, and/or positioning component 342, any or all of which may be considered means for performing this operation. In an aspect, where the positioning entity is a component of a base station, operation 1030 may be performed by the one or more WWAN transceivers 350, the one or more network transceivers 380, the one or more processors 384, memory 386, and/or positioning component 388, any or all of which may be considered means for performing this operation. In an aspect, where the positioning entity is a component of a location server, operation 1030 may be performed by the one or more network transceivers 390, the one or more processors 394, memory 396, and/or positioning component 398, any or all of which may be considered means for performing this operation.

As will be appreciated, a technical advantage of the method 1000 is improved positioning accuracy by identifying LOS links and rejecting NLOS links.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), comprising: performing an outlier rejection algorithm on a plurality of links over which the UE receives positioning reference signals (PRS) to determine a set of inlier links of the plurality of links; and estimating a location of the UE, or enabling the location of the UE to be estimated, based on the set of inlier links.

Clause 2. The method of clause 1, wherein the outlier rejection algorithm is a timing-based outlier rejection algorithm.

Clause 3. The method of any of clauses 1 to 2, wherein the outlier rejection algorithm is an angle-based outlier rejection algorithm.

Clause 4. The method of any of clauses 1 to 3, wherein the outlier rejection algorithm rejects non-line of sight (NLOS) links of the plurality of links.

Clause 5. The method of any of clauses 1 to 4, wherein the outlier rejection algorithm iteratively performs a consensus test on subsets of the plurality of links to determine a best set of links for estimating the location of the UE.

Clause 6. The method of clause 5, wherein the consensus test is a timing-based consensus test.

Clause 7. The method of any of clauses 5 to 6, wherein the consensus test is an angle-based consensus test.

Clause 8. An apparatus comprising a memory, at least one transceiver, and at least one processor communicatively coupled to the memory and the at least one transceiver, the memory, the at least one transceiver, and the at least one processor configured to perform a method according to any of clauses 1 to 7.

Clause 9. An apparatus comprising means for performing a method according to any of clauses 1 to 7.

Clause 10. A non-transitory computer-readable medium storing computer-executable instructions, the computer-executable comprising at least one instruction for causing a computer or processor to perform a method according to any of clauses 1 to 7.

Additional implementation examples are described in the following numbered clauses:

Clause 1. A method of wireless positioning performed by a positioning entity, comprising: determining an initial set of wireless links over which positioning reference signals (PRS) are measured by a network node engaged in a positioning session; identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determining a location of the network node based on observed positioning measurements of the identified subset of wireless links.

Clause 2. The method of clause 1, wherein: identifying the subset of wireless links comprises iterating over different subsets of wireless links of the initial set of wireless links to determine a best set of inlier wireless links, the best set of inlier wireless links has more inlier wireless links than all other sets of inlier wireless links determined from the initial set of wireless links, a fewest number of consensus test errors over all sets of inlier wireless links determined from the initial set of wireless links, or both, and the identified subset of wireless links corresponds to the best set of inlier wireless links.

Clause 3. The method of clause 2, wherein iterating over the different subsets of wireless links comprises: selecting, for a first iteration of a plurality of iterations, a first subset of wireless links from the initial set of wireless links; determining a first location of the network node based on measurements of PRS performed by the network node over the first subset of wireless links; determining a first set of expected positioning measurements based on the first location of the network node, wherein the first set of expected positioning measurements includes a first expected positioning measurement for each wireless link in the initial set of wireless links; and performing a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

Clause 4. The method of clause 3, wherein a second iteration of the plurality of iterations comprises: selecting a second subset of wireless links from the initial set of wireless links; determining a second location of the network node based on measurements of PRS taken by the network node over the second subset of wireless links; determining a second set of expected positioning measurements based on the second location of the network node, wherein the second set of expected positioning measurements includes a second expected positioning measurement for each wireless link in the initial set of wireless links; and performing a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

Clause 5. The method of clause 4, wherein: the first set of expected positioning measurements is a set of expected timing-based positioning measurements, the second set of expected positioning measurements is a set of expected angle-based positioning measurements, and the method further comprises determining an intersection or a union between the first set of inlier wireless links and the second set of inlier wireless links.

Clause 6. The method of any of clauses 3 to 5, wherein the first subset of wireless links comprises a minimum number of links needed to determine the first location of the network node for the positioning session.

Clause 7. The method of any of clauses 3 to 6, wherein a number of the plurality of iterations is manually selected, based on a computational budget of the network node, based on a latency requirement for the positioning session, or any combination thereof.

Clause 8. The method of any of clauses 3 to 7, wherein the tolerance threshold is a fixed threshold based on a bandwidth of the PRS measured by the network node, an interpolation algorithm, a noise level, a signal-to-interference-plus-noise ratio (SINR), or any combination thereof.

Clause 9. The method of any of clauses 3 to 8, wherein the tolerance threshold increases over the plurality of iterations until a consensus test is passed for at least one subset of wireless links of the initial set of wireless links or a threshold is reached.

Clause 10. The method of any of clauses 3 to 9, wherein: determining the first subset of wireless links comprises randomly sampling the initial set of wireless links to determine the first subset of wireless links, and a maximum number of the plurality of iterations is based on a computational budget of the network node, a latency requirement for the positioning session, or both.

Clause 11. The method of any of clauses 3 to 10, wherein the first subset of wireless links is one of all possible subsets of wireless links of the initial set of wireless links based on a number of the all possible subsets of wireless links being less than a threshold.

Clause 12. The method of any of clauses 3 to 11, wherein determining the first subset of wireless links comprises: sampling incrementally larger subsets of wireless links of the initial set of wireless links until a consensus test is passed, a maximum number of the plurality of iterations is reached, or all subsets of wireless links of the initial set of wireless links are tested.

Clause 13. The method of clause 12, wherein sampling incrementally larger subsets of wireless links of the initial set of wireless links comprises: selecting an initial subset of wireless links from the initial set of wireless links, wherein a number of the initial subset of wireless links is greater than a number of the first subset of wireless links; determining all possible subsets of wireless links of the initial subset of wireless links; selecting, based on no consensus being reached for the all possible subsets of wireless links of the initial subset of wireless links, a second subset of wireless links from the initial set of wireless links, wherein a number of the second subset of wireless links is greater than the number of the initial subset of wireless links; and determining all possible subsets of wireless links of the second subset of wireless links other than at least the all possible subsets of wireless links of the initial subset of wireless links, wherein the first subset of wireless links is one of the all possible subsets of wireless links of the second subset of wireless links.

Clause 14. The method of any of clauses 1 to 13, wherein the expected positioning measurement comprises an expected reference signal time difference (RSTD) measurement, an expected time of arrival (ToA) measurement, or an expected angle-based measurement.

Clause 15. The method of any of clauses 1 to 14, wherein the positioning session comprises a time-difference of arrival (TDOA) based positioning session, a round-trip-time (RTT) positioning session, or an angle-based positioning session.

Clause 16. The method of any of clauses 1 to 15, wherein the positioning entity comprises: the network node, a component of a radio access network (RAN), or a location server.

Clause 17. The method of any of clauses 1 to 16, wherein: the network node comprises a first user equipment (UE), and the anchor node comprises a transmission-reception point (TRP) or a second UE.

Clause 18. The method of any of clauses 1 to 16, wherein: the network node comprises a first TRP, and the anchor node comprises a UE or a second TRP.

Clause 19. A positioning entity, comprising: a memory; at least one transceiver; and at least one processor communicatively coupled to the memory and the at least one transceiver, the at least one processor configured to: determine an initial set of wireless links over which positioning reference signals (PRS) are measured by a network node engaged in a positioning session; identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

Clause 20. The positioning entity of clause 19, wherein: the at least one processor configured to identify the subset of wireless links comprises the at least one processor configured to iterate over different subsets of wireless links of the initial set of wireless links to determine a best set of inlier wireless links, the best set of inlier wireless links has more inlier wireless links than all other sets of inlier wireless links determined from the initial set of wireless links, a fewest number of consensus test errors over all sets of inlier wireless links determined from the initial set of wireless links, or both, and the identified subset of wireless links corresponds to the best set of inlier wireless links.

Clause 21. The positioning entity of clause 20, wherein the at least one processor configured to iterate over the different subsets of wireless links comprises the at least one processor configured to: select, for a first iteration of a plurality of iterations, a first subset of wireless links from the initial set of wireless links; determine a first location of the network node based on measurements of PRS performed by the network node over the first subset of wireless links; determine a first set of expected positioning measurements based on the first location of the network node, wherein the first set of expected positioning measurements includes a first expected positioning measurement for each wireless link in the initial set of wireless links; and perform a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

Clause 22. The positioning entity of clause 21, wherein a second iteration of the plurality of iterations comprises the at least one processor configured to: select a second subset of wireless links from the initial set of wireless links; determine a second location of the network node based on measurements of PRS taken by the network node over the second subset of wireless links; determine a second set of expected positioning measurements based on the second location of the network node, wherein the second set of expected positioning measurements includes a second expected positioning measurement for each wireless link in the initial set of wireless links; and perform a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

Clause 23. The positioning entity of clause 22, wherein: the first set of expected positioning measurements is a set of expected timing-based positioning measurements, the second set of expected positioning measurements is a set of expected angle-based positioning measurements, and the at least one processor is further configured to determine an intersection or a union between the first set of inlier wireless links and the second set of inlier wireless links.

Clause 24. The positioning entity of any of clauses 21 to 23, wherein the first subset of wireless links comprises a minimum number of links needed to determine the first location of the network node for the positioning session.

Clause 25. The positioning entity of any of clauses 21 to 24, wherein a number of the plurality of iterations is manually selected, based on a computational budget of the network node, based on a latency requirement for the positioning session, or any combination thereof.

Clause 26. The positioning entity of any of clauses 21 to 25, wherein the tolerance threshold is a fixed threshold based on a bandwidth of the PRS measured by the network node, an interpolation algorithm, a noise level, a signal-to-interference-plus-noise ratio (SINR), or any combination thereof.

Clause 27. The positioning entity of any of clauses 21 to 26, wherein the tolerance threshold increases over the plurality of iterations until a consensus test is passed for at least one subset of wireless links of the initial set of wireless links or a threshold is reached.

Clause 28. The positioning entity of any of clauses 21 to 27, wherein: the at least one processor configured to determine the first subset of wireless links comprises the at least one processor configured to randomly sample the initial set of wireless links to determine the first subset of wireless links, and a maximum number of the plurality of iterations is based on a computational budget of the network node, a latency requirement for the positioning session, or both.

Clause 29. The positioning entity of any of clauses 21 to 28, wherein the first subset of wireless links is one of all possible subsets of wireless links of the initial set of wireless links based on a number of the all possible subsets of wireless links being less than a threshold.

Clause 30. The positioning entity of any of clauses 21 to 29, wherein the at least one processor configured to determine the first subset of wireless links comprises the at least one processor configured to: sample incrementally larger subsets of wireless links of the initial set of wireless links until a consensus test is passed, a maximum number of the plurality of iterations is reached, or all subsets of wireless links of the initial set of wireless links are tested.

Clause 31. The positioning entity of clause 30, wherein the at least one processor configured to sample incrementally larger subsets of wireless links of the initial set of wireless links comprises the at least one processor configured to: select an initial subset of wireless links from the initial set of wireless links, wherein a number of the initial subset of wireless links is greater than a number of the first subset of wireless links; determine all possible subsets of wireless links of the initial subset of wireless links; select, based on no consensus being reached for the all possible subsets of wireless links of the initial subset of wireless links, a second subset of wireless links from the initial set of wireless links, wherein a number of the second subset of wireless links is greater than the number of the initial subset of wireless links; and determine all possible subsets of wireless links of the second subset of wireless links other than at least the all possible subsets of wireless links of the initial subset of wireless links, wherein the first subset of wireless links is one of the all possible subsets of wireless links of the second subset of wireless links.

Clause 32. The positioning entity of any of clauses 19 to 31, wherein the expected positioning measurement comprises an expected reference signal time difference (RSTD) measurement, an expected time of arrival (ToA) measurement, or an expected angle-based measurement.

Clause 33. The positioning entity of any of clauses 19 to 32, wherein the positioning session comprises a time-difference of arrival (TDOA) based positioning session, a round-trip-time (RTT) positioning session, or an angle-based positioning session.

Clause 34. The positioning entity of any of clauses 19 to 33, wherein the positioning entity comprises: the network node, a component of a radio access network (RAN), or a location server.

Clause 35. The positioning entity of any of clauses 19 to 34, wherein: the network node comprises a first user equipment (UE), and the anchor node comprises a transmission-reception point (TRP) or a second UE.

Clause 36. The positioning entity of any of clauses 19 to 34, wherein: the network node comprises a first TRP, and the anchor node comprises a UE or a second TRP.

Clause 37. A positioning entity, comprising: means for determining an initial set of wireless links over which positioning reference signals (PRS) are measured by a network node engaged in a positioning session; means for identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and means for determining a location of the network node based on observed positioning measurements of the identified subset of wireless links.

Clause 38. The positioning entity of clause 37, wherein: the means for identifying the subset of wireless links comprises means for iterating over different subsets of wireless links of the initial set of wireless links to determine a best set of inlier wireless links, the best set of inlier wireless links has more inlier wireless links than all other sets of inlier wireless links determined from the initial set of wireless links, a fewest number of consensus test errors over all sets of inlier wireless links determined from the initial set of wireless links, or both, and the identified subset of wireless links corresponds to the best set of inlier wireless links.

Clause 39. The positioning entity of clause 38, wherein the means for iterating over the different subsets of wireless links comprises: means for selecting, for a first iteration of a plurality of iterations, a first subset of wireless links from the initial set of wireless links; means for determining a first location of the network node based on measurements of PRS performed by the network node over the first subset of wireless links; means for determining a first set of expected positioning measurements based on the first location of the network node, wherein the first set of expected positioning measurements includes a first expected positioning measurement for each wireless link in the initial set of wireless links; and means for performing a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

Clause 40. The positioning entity of clause 39, wherein means for performing a second iteration of the plurality of iterations comprises: means for selecting a second subset of wireless links from the initial set of wireless links; means for determining a second location of the network node based on measurements of PRS taken by the network node over the second subset of wireless links; means for determining a second set of expected positioning measurements based on the second location of the network node, wherein the second set of expected positioning measurements includes a second expected positioning measurement for each wireless link in the initial set of wireless links; and means for performing a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

Clause 41. The positioning entity of clause 40, wherein: the first set of expected positioning measurements is a set of expected timing-based positioning measurements, the second set of expected positioning measurements is a set of expected angle-based positioning measurements, and the positioning entity further comprises means for determining an intersection or a union between the first set of inlier wireless links and the second set of inlier wireless links.

Clause 42. The positioning entity of any of clauses 39 to 41, wherein the first subset of wireless links comprises a minimum number of links needed to determine the first location of the network node for the positioning session.

Clause 43. The positioning entity of any of clauses 39 to 42, wherein a number of the plurality of iterations is manually selected, based on a computational budget of the network node, based on a latency requirement for the positioning session, or any combination thereof.

Clause 44. The positioning entity of any of clauses 39 to 43, wherein the tolerance threshold is a fixed threshold based on a bandwidth of the PRS measured by the network node, an interpolation algorithm, a noise level, a signal-to-interference-plus-noise ratio (SINR), or any combination thereof.

Clause 45. The positioning entity of any of clauses 39 to 44, wherein the tolerance threshold increases over the plurality of iterations until a consensus test is passed for at least one subset of wireless links of the initial set of wireless links or a threshold is reached.

Clause 46. The positioning entity of any of clauses 39 to 45, wherein: the means for determining the first subset of wireless links comprises means for randomly sampling the initial set of wireless links to determine the first subset of wireless links, and a maximum number of the plurality of iterations is based on a computational budget of the network node, a latency requirement for the positioning session, or both.

Clause 47. The positioning entity of any of clauses 39 to 46, wherein the first subset of wireless links is one of all possible subsets of wireless links of the initial set of wireless links based on a number of the all possible subsets of wireless links being less than a threshold.

Clause 48. The positioning entity of any of clauses 39 to 47, wherein the means for determining the first subset of wireless links comprises: means for sampling incrementally larger subsets of wireless links of the initial set of wireless links until a consensus test is passed, a maximum number of the plurality of iterations is reached, or all subsets of wireless links of the initial set of wireless links are tested.

Clause 49. The positioning entity of clause 48, wherein the means for sampling incrementally larger subsets of wireless links of the initial set of wireless links comprises: means for selecting an initial subset of wireless links from the initial set of wireless links, wherein a number of the initial subset of wireless links is greater than a number of the first subset of wireless links; means for determining all possible subsets of wireless links of the initial subset of wireless links; means for selecting, based on no consensus being reached for the all possible subsets of wireless links of the initial subset of wireless links, a second subset of wireless links from the initial set of wireless links, wherein a number of the second subset of wireless links is greater than the number of the initial subset of wireless links; and means for determining all possible subsets of wireless links of the second subset of wireless links other than at least the all possible subsets of wireless links of the initial subset of wireless links, wherein the first subset of wireless links is one of the all possible subsets of wireless links of the second subset of wireless links.

Clause 50. The positioning entity of any of clauses 37 to 49, wherein the expected positioning measurement comprises an expected reference signal time difference (RSTD) measurement, an expected time of arrival (ToA) measurement, or an expected angle-based measurement.

Clause 51. The positioning entity of any of clauses 37 to 50, wherein the positioning session comprises a time-difference of arrival (TDOA) based positioning session, a round-trip-time (RTT) positioning session, or an angle-based positioning session.

Clause 52. The positioning entity of any of clauses 37 to 51, wherein the positioning entity comprises: the network node, a component of a radio access network (RAN), or a location server.

Clause 53. The positioning entity of any of clauses 37 to 52, wherein: the network node comprises a first user equipment (UE), and the anchor node comprises a transmission-reception point (TRP) or a second UE.

Clause 54. The positioning entity of any of clauses 37 to 52, wherein: the network node comprises a first TRP, and the anchor node comprises a UE or a second TRP.

Clause 55. A non-transitory computer-readable medium storing computer-executable instructions that, when executed by a positioning entity, cause the positioning entity to: determine an initial set of wireless links over which positioning reference signals (PRS) are measured by a network node engaged in a positioning session; identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

Clause 56. The non-transitory computer-readable medium of clause 55, wherein: the computer-executable instructions that, when executed by the positioning entity, cause the positioning entity to identify the subset of wireless links comprise computer-executable instructions that, when executed by the positioning entity, cause the positioning entity to iterate over different subsets of wireless links of the initial set of wireless links to determine a best set of inlier wireless links, the best set of inlier wireless links has more inlier wireless links than all other sets of inlier wireless links determined from the initial set of wireless links, a fewest number of consensus test errors over all sets of inlier wireless links determined from the initial set of wireless links, or both, and the identified subset of wireless links corresponds to the best set of inlier wireless links.

Clause 57. The non-transitory computer-readable medium of clause 56, wherein the computer-executable instructions that, when executed by the positioning entity, cause the positioning entity to iterate over the different subsets of wireless links comprise computer-executable instructions that, when executed by the positioning entity, cause the positioning entity to: select, for a first iteration of a plurality of iterations, a first subset of wireless links from the initial set of wireless links; determine a first location of the network node based on measurements of PRS performed by the network node over the first subset of wireless links; determine a first set of expected positioning measurements based on the first location of the network node, wherein the first set of expected positioning measurements includes a first expected positioning measurement for each wireless link in the initial set of wireless links; and perform a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

Clause 58. The non-transitory computer-readable medium of clause 57, wherein computer-executable instructions that, when executed by the positioning entity, cause the positioning entity to perform a second iteration of the plurality of iterations comprise computer-executable instructions that, when executed by the positioning entity, cause the positioning entity to: select a second subset of wireless links from the initial set of wireless links; determine a second location of the network node based on measurements of PRS taken by the network node over the second subset of wireless links; determine a second set of expected positioning measurements based on the second location of the network node, wherein the second set of expected positioning measurements includes a second expected positioning measurement for each wireless link in the initial set of wireless links; and perform a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

Clause 59. The non-transitory computer-readable medium of clause 58, wherein: the first set of expected positioning measurements is a set of expected timing-based positioning measurements, the second set of expected positioning measurements is a set of expected angle-based positioning measurements, and the computer-executable instructions that, when executed by the positioning entity, cause the positioning entity to further comprise computer-executable instructions that, when executed by the positioning entity, cause the positioning entity to determine an intersection or a union between the first set of inlier wireless links and the second set of inlier wireless links.

Clause 60. The non-transitory computer-readable medium of any of clauses 57 to 59, wherein the first subset of wireless links comprises a minimum number of links needed to determine the first location of the network node for the positioning session.

Clause 61. The non-transitory computer-readable medium of any of clauses 57 to 60, wherein a number of the plurality of iterations is manually selected, based on a computational budget of the network node, based on a latency requirement for the positioning session, or any combination thereof.

Clause 62. The non-transitory computer-readable medium of any of clauses 57 to 61, wherein the tolerance threshold is a fixed threshold based on a bandwidth of the PRS measured by the network node, an interpolation algorithm, a noise level, a signal-to-interference-plus-noise ratio (SINR), or any combination thereof.

Clause 63. The non-transitory computer-readable medium of any of clauses 57 to 62, wherein the tolerance threshold increases over the plurality of iterations until a consensus test is passed for at least one subset of wireless links of the initial set of wireless links or a threshold is reached.

Clause 64. The non-transitory computer-readable medium of any of clauses 57 to 63, wherein: the computer-executable instructions that, when executed by the positioning entity, cause the positioning entity to determine the first subset of wireless links comprise computer-executable instructions that, when executed by the positioning entity, cause the positioning entity to randomly sample the initial set of wireless links to determine the first subset of wireless links, and a maximum number of the plurality of iterations is based on a computational budget of the network node, a latency requirement for the positioning session, or both.

Clause 65. The non-transitory computer-readable medium of any of clauses 57 to 64, wherein the first subset of wireless links is one of all possible subsets of wireless links of the initial set of wireless links based on a number of the all possible subsets of wireless links being less than a threshold.

Clause 66. The non-transitory computer-readable medium of any of clauses 57 to 65, wherein the computer-executable instructions that, when executed by the positioning entity, cause the positioning entity to determine the first subset of wireless links comprise computer-executable instructions that, when executed by the positioning entity, cause the positioning entity to: sample incrementally larger subsets of wireless links of the initial set of wireless links until a consensus test is passed, a maximum number of the plurality of iterations is reached, or all subsets of wireless links of the initial set of wireless links are tested.

Clause 67. The non-transitory computer-readable medium of clause 66, wherein the computer-executable instructions that, when executed by the positioning entity, cause the positioning entity to sample incrementally larger subsets of wireless links of the initial set of wireless links comprise computer-executable instructions that, when executed by the positioning entity, cause the positioning entity to: select an initial subset of wireless links from the initial set of wireless links, wherein a number of the initial subset of wireless links is greater than a number of the first subset of wireless links; determine all possible subsets of wireless links of the initial subset of wireless links; select, based on no consensus being reached for the all possible subsets of wireless links of the initial subset of wireless links, a second subset of wireless links from the initial set of wireless links, wherein a number of the second subset of wireless links is greater than the number of the initial subset of wireless links; and determine all possible subsets of wireless links of the second subset of wireless links other than at least the all possible subsets of wireless links of the initial subset of wireless links, wherein the first subset of wireless links is one of the all possible subsets of wireless links of the second subset of wireless links.

Clause 68. The non-transitory computer-readable medium of any of clauses 55 to 67, wherein the expected positioning measurement comprises an expected reference signal time difference (RSTD) measurement, an expected time of arrival (ToA) measurement, or an expected angle-based measurement.

Clause 69. The non-transitory computer-readable medium of any of clauses 55 to 68, wherein the positioning session comprises a time-difference of arrival (TDOA) based positioning session, a round-trip-time (RTT) positioning session, or an angle-based positioning session.

Clause 70. The non-transitory computer-readable medium of any of clauses 55 to 69, wherein the positioning entity comprises: the network node, a component of a radio access network (RAN), or a location server.

Clause 71. The non-transitory computer-readable medium of any of clauses 55 to 70, wherein: the network node comprises a first user equipment (UE), and the anchor node comprises a transmission-reception point (TRP) or a second UE.

Clause 72. The non-transitory computer-readable medium of any of clauses 55 to 70, wherein: the network node comprises a first TRP, and the anchor node comprises a UE or a second TRP.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a positioning entity, comprising:
   determining an initial set of wireless links over which positioning reference signals (PRS) are measured by a network node engaged in a positioning session;
   identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and
   determining a location of the network node based on observed positioning measurements of the identified subset of wireless links.

2. The method of claim 1, wherein:
   identifying the subset of wireless links comprises iterating over different subsets of wireless links of the initial set of wireless links to determine a best set of inlier wireless links,
   the best set of inlier wireless links has more inlier wireless links than all other sets of inlier wireless links determined from the initial set of wireless links, a fewest number of consensus test errors over all sets of inlier wireless links determined from the initial set of wireless links, or both, and
   the identified subset of wireless links corresponds to the best set of inlier wireless links.

3. The method of claim 2, wherein iterating over the different subsets of wireless links comprises:
   selecting, for a first iteration of a plurality of iterations, a first subset of wireless links from the initial set of wireless links;
   determining a first location of the network node based on measurements of PRS performed by the network node over the first subset of wireless links;
   determining a first set of expected positioning measurements based on the first location of the network node, wherein the first set of expected positioning measurements includes a first expected positioning measurement for each wireless link in the initial set of wireless links; and
   performing a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

4. The method of claim 3, wherein a second iteration of the plurality of iterations comprises:
selecting a second subset of wireless links from the initial set of wireless links;
determining a second location of the network node based on measurements of PRS taken by the network node over the second subset of wireless links;
determining a second set of expected positioning measurements based on the second location of the network node, wherein the second set of expected positioning measurements includes a second expected positioning measurement for each wireless link in the initial set of wireless links; and
performing a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

5. The method of claim 4, wherein:
the first set of expected positioning measurements is a set of expected timing-based positioning measurements,
the second set of expected positioning measurements is a set of expected angle-based positioning measurements, and
the method further comprises determining an intersection or a union between the first set of inlier wireless links and the second set of inlier wireless links.

6. The method of claim 3, wherein the first subset of wireless links comprises a minimum number of links needed to determine the first location of the network node for the positioning session.

7. The method of claim 3, wherein a number of the plurality of iterations is manually selected, based on a computational budget of the network node, based on a latency requirement for the positioning session, or any combination thereof.

8. The method of claim 3, wherein the tolerance threshold is a fixed threshold based on a bandwidth of the PRS measured by the network node, an interpolation algorithm, a noise level, a signal-to-interference-plus-noise ratio (SINR), or any combination thereof.

9. The method of claim 3, wherein the tolerance threshold increases over the plurality of iterations until a consensus test is passed for at least one subset of wireless links of the initial set of wireless links or a threshold is reached.

10. The method of claim 3, wherein:
determining the first subset of wireless links comprises randomly sampling the initial set of wireless links to determine the first subset of wireless links, and
a maximum number of the plurality of iterations is based on a computational budget of the network node, a latency requirement for the positioning session, or both.

11. The method of claim 3, wherein the first subset of wireless links is one of all possible subsets of wireless links of the initial set of wireless links based on a number of the all possible subsets of wireless links being less than a threshold.

12. The method of claim 3, wherein determining the first subset of wireless links comprises:
sampling incrementally larger subsets of wireless links of the initial set of wireless links until a consensus test is passed, a maximum number of the plurality of iterations is reached, or all subsets of wireless links of the initial set of wireless links are tested.

13. The method of claim 12, wherein sampling incrementally larger subsets of wireless links of the initial set of wireless links comprises:
selecting an initial subset of wireless links from the initial set of wireless links, wherein a number of the initial subset of wireless links is greater than a number of the first subset of wireless links;
determining all possible subsets of wireless links of the initial subset of wireless links;
selecting, based on no consensus being reached for the all possible subsets of wireless links of the initial subset of wireless links, a second subset of wireless links from the initial set of wireless links, wherein a number of the second subset of wireless links is greater than the number of the initial subset of wireless links; and
determining all possible subsets of wireless links of the second subset of wireless links other than at least the all possible subsets of wireless links of the initial subset of wireless links, wherein the first subset of wireless links is one of the all possible subsets of wireless links of the second subset of wireless links.

14. The method of claim 1, wherein the expected positioning measurement comprises an expected reference signal time difference (RSTD) measurement, an expected time of arrival (ToA) measurement, or an expected angle-based measurement.

15. The method of claim 1, wherein the positioning session comprises a time-difference of arrival (TDOA) based positioning session, a round-trip-time (RTT) positioning session, or an angle-based positioning session.

16. The method of claim 1, wherein the positioning entity comprises:
the network node,
a component of a radio access network (RAN), or
a location server.

17. The method of claim 1, wherein:
the network node comprises a first user equipment (UE), and
the anchor node comprises a transmission-reception point (TRP) or a second UE.

18. The method of claim 1, wherein:
the network node comprises a first TRP, and
the anchor node comprises a UE or a second TRP.

19. A positioning entity, comprising:
a memory;
at least one transceiver; and
at least one processor communicatively coupled to the memory and the at least one transceiver, the at least one processor configured to:
determine an initial set of wireless links over which positioning reference signals (PRS) are measured by a network node engaged in a positioning session;
identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

20. The positioning entity of claim 19, wherein:
the at least one processor configured to identify the subset of wireless links comprises the at least one processor configured to iterate over different subsets of wireless links of the initial set of wireless links to determine a best set of inlier wireless links,
the best set of inlier wireless links has more inlier wireless links than all other sets of inlier wireless links determined from the initial set of wireless links, a fewest number of consensus test errors over all sets of inlier wireless links determined from the initial set of wireless links, or both, and
the identified subset of wireless links corresponds to the best set of inlier wireless links.

21. The positioning entity of claim 20, wherein the at least one processor configured to iterate over the different subsets of wireless links comprises the at least one processor configured to:
select, for a first iteration of a plurality of iterations, a first subset of wireless links from the initial set of wireless links;
determine a first location of the network node based on measurements of PRS performed by the network node over the first subset of wireless links;
determine a first set of expected positioning measurements based on the first location of the network node, wherein the first set of expected positioning measurements includes a first expected positioning measurement for each wireless link in the initial set of wireless links; and
perform a first consensus test to determine a first set of inlier wireless links from the initial set of wireless links based on the first set of expected positioning measurements, wherein, for each inlier wireless link of the first set of inlier wireless links, a difference between a first expected positioning measurement for the inlier wireless link from the first set of expected positioning measurements is within a tolerance threshold of an observed positioning measurement for the inlier wireless link.

22. The positioning entity of claim 21, wherein a second iteration of the plurality of iterations comprises the at least one processor configured to:
select a second subset of wireless links from the initial set of wireless links;
determine a second location of the network node based on measurements of PRS taken by the network node over the second subset of wireless links;
determine a second set of expected positioning measurements based on the second location of the network node, wherein the second set of expected positioning measurements includes a second expected positioning measurement for each wireless link in the initial set of wireless links; and
perform a second consensus test to determine a second set of inlier wireless links from the initial set of wireless links based on the second set of expected positioning measurements, wherein, for each inlier wireless link of the second set of inlier wireless links, a difference between a second expected positioning measurement for the inlier wireless link from the second set of expected positioning measurements is within the tolerance threshold of the observed positioning measurement for the inlier wireless link.

23. The positioning entity of claim 22, wherein:
the first set of expected positioning measurements is a set of expected timing-based positioning measurements,
the second set of expected positioning measurements is a set of expected angle-based positioning measurements, and
the at least one processor is further configured to determine an intersection or a union between the first set of inlier wireless links and the second set of inlier wireless links.

24. The positioning entity of claim 21, wherein a number of the plurality of iterations is manually selected, based on a computational budget of the network node, based on a latency requirement for the positioning session, or any combination thereof.

25. The positioning entity of claim 21, wherein the tolerance threshold increases over the plurality of iterations until a consensus test is passed for at least one subset of wireless links of the initial set of wireless links or a threshold is reached.

26. The positioning entity of claim 21, wherein:
the at least one processor configured to determine the first subset of wireless links comprises the at least one processor configured to randomly sample the initial set of wireless links to determine the first subset of wireless links, and
a maximum number of the plurality of iterations is based on a computational budget of the network node, a latency requirement for the positioning session, or both.

27. The positioning entity of claim 21, wherein the at least one processor configured to determine the first subset of wireless links comprises the at least one processor configured to:
sample incrementally larger subsets of wireless links of the initial set of wireless links until a consensus test is passed, a maximum number of the plurality of iterations is reached, or all subsets of wireless links of the initial set of wireless links are tested.

28. The positioning entity of claim 27, wherein the at least one processor configured to sample incrementally larger subsets of wireless links of the initial set of wireless links comprises the at least one processor configured to:
select an initial subset of wireless links from the initial set of wireless links, wherein a number of the initial subset of wireless links is greater than a number of the first subset of wireless links;
determine all possible subsets of wireless links of the initial subset of wireless links;
select, based on no consensus being reached for the all possible subsets of wireless links of the initial subset of wireless links, a second subset of wireless links from the initial set of wireless links, wherein a number of the second subset of wireless links is greater than the number of the initial subset of wireless links; and
determine all possible subsets of wireless links of the second subset of wireless links other than at least the all possible subsets of wireless links of the initial subset of wireless links, wherein the first subset of wireless links is one of the all possible subsets of wireless links of the second subset of wireless links.

29. A positioning entity, comprising:
means for determining an initial set of wireless links over which positioning reference signals (PRS) are measured by a network node engaged in a positioning session;
means for identifying a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and means for determining a location of the network node based on observed positioning measurements of the identified subset of wireless links.

30. A non-transitory computer-readable medium storing computer-executable instructions that, when executed by a positioning entity, cause the positioning entity to:

determine an initial set of wireless links over which positioning reference signals (PRS) are measured by a network node engaged in a positioning session;

identify a subset of wireless links of the initial set of wireless links based on an expected positioning measurement associated with a corresponding wireless link of the initial set of wireless links, a location of an anchor node associated with the corresponding wireless link, and an observed positioning measurement for the corresponding wireless link; and determine a location of the network node based on observed positioning measurements of the identified subset of wireless links.

\* \* \* \* \*